United States Patent [19]
Reese et al.

[11] Patent Number: 5,976,010
[45] Date of Patent: Nov. 2, 1999

[54] ENERGY EFFICIENT AIR QUALITY MAINTENANCE SYSTEM AND METHOD

[75] Inventors: James A. Reese, Overland Park; John Perlot Kettler, Shawnee, both of Kans.

[73] Assignee: York International Corporation, York, Pa.

[21] Appl. No.: 08/884,053

[22] Filed: Jun. 27, 1997

[51] Int. Cl.$^6$ ........................................... F24F 13/00
[52] U.S. Cl. .......................................... 454/229; 454/236
[58] Field of Search .............................. 454/228, 229, 454/236

[56] References Cited

U.S. PATENT DOCUMENTS

| | | | |
|---|---|---|---|
| 3,926,101 | 12/1975 | Moss | 454/229 |
| 3,949,809 | 4/1976 | Gilles | 454/229 X |
| 4,164,172 | 8/1979 | Anderten et al. | 454/229 |
| 4,437,608 | 3/1984 | Smith . | |
| 4,742,761 | 5/1988 | Horstman . | |
| 4,828,168 | 5/1989 | Odajima . | |
| 4,960,041 | 10/1990 | Kiser | 454/229 X |
| 4,995,307 | 2/1991 | Floyd . | |
| 5,024,263 | 6/1991 | Laine et al. . | |
| 5,117,900 | 6/1992 | Cox . | |
| 5,119,987 | 6/1992 | Kobayashi . | |
| 5,267,897 | 12/1993 | Drees . | |
| 5,279,609 | 1/1994 | Meckler . | |
| 5,292,280 | 3/1994 | Janu et al. . | |
| 5,332,151 | 7/1994 | Kwak | 454/299 X |
| 5,394,934 | 3/1995 | Rein et al. . | |
| 5,464,369 | 11/1995 | Federspiel | 454/229 X |
| 5,643,077 | 7/1997 | Ayer | 454/54 |

FOREIGN PATENT DOCUMENTS

| | | | |
|---|---|---|---|
| 1-181026 | 7/1989 | Japan | 454/229 |

*Primary Examiner*—Harold Joyce
*Attorney, Agent, or Firm*—Finnegan, Henderson, Farabow, Garrett & Dunner, L.L.P.

[57] ABSTRACT

A heating, ventilation, and air conditioning (HVAC) system uses unvitiated secondary return air to control the amount of a contaminant, such as carbon dioxide, in a space to maintain an improved air quality throughout the area served by the system. Preferably a terminal box controls the $CO_2$ level in the space served by the box by selectively drawing air representative of air in other rooms to lower the $CO_2$ level in the space being served. This reduces cost because air which is provided from other rooms within the building will require less total system heating or cooling in order to maintain the occupied space at the desired air quality.

30 Claims, 6 Drawing Sheets

ENERGY EFFICIENT AIR QUALITY MAINTENANCE SYSTEM AND METHOD

BACKGROUND OF THE INVENTION

1. Field of the Invention

This invention relates to heating, ventilation, and air conditioning, and more particularly to a system for maintaining good air quality in the spaces being conditioned.

2. Background of the Invention

Environmental comfort has recently become an increasingly important concern for modern office buildings. In response, many designers are now offering heating, ventilation, and air conditioning (HVAC) equipment that not only maintains a more uniform distribution of temperatures, but also allows individual occupants to better control the comfort of their individual spaces. An additional goal of these modern systems is to improve the overall office environment by delivering properly humidified, good quality air while simultaneously maintaining a suitable sound level at full and part load.

An office building floor may be conceptualized as a series of thermal zones. Thermal zones result from varying loads acting in different regions of the building. For example, the outermost zones experience "skin load" which results from effects such as thermal transmission through an outer wall or window, air infiltration from outside, and/or solar heating. Interior zones are not as susceptible to these loads, but will be affected by heat given off from people, lights, office equipment, etc. Perimeter zones, for example, sizeable exterior offices, are affected by all of these loads. In a simple open plan space, the perimeter zone is usually considered to extend inwardly from the outer walls of the building to a distance approximately 1.5 times the ceiling height.

A simple, rectangular building normally has a minimum of nine zones per floor, but many larger buildings can have more than twenty zones per floor. The loads required to maintain the temperatures of the zones can vary depending on the time of day or how they are used. For example, the motion of the sun causes significant load shift in buildings, especially those buildings with a high percentage of windows. Proper zoning enables the environmental control system to maintain comfort in all of the zones, even when the loads shift.

In a modern indoor environmental quality air handling system, primary air, typically outdoor air mixed with an amount of return air, is filtered, humidified or dehumidified, and heated or cooled to a temperature typically between 40–50° F. (4–10° C.) at a central unit. A central fan unit blows the treated primary air into supply ducts which circulate the primary air throughout the floor, or ceiling, or other air containment channels in the building to the various zones, each zone usually containing a number of terminal units. Each terminal unit serves an individual space, such as an individual office, or group of spaces and is controlled in response to space or zone thermostats.

Most modern office buildings use variable-air-volume (VAV) HVAC systems. Generally, there are five types of VAV terminal units available: dual duct, cooling only, cooling with reheat, series fan terminals, and parallel fan terminals. Cooling only and cooling with reheat units typically treat (heat/cool/humidify/filter) all air delivered to a space at a primary (central) air handling unit and do not utilize air from the ceiling plenum or other spaces to increase air flow or temper the air being delivered to the space without passing that air through the primary air handling units.

Fan terminal boxes and dual duct/dual fan systems utilize a method of diluting contaminant concentrations in a given space by increasing the flow of return or recirculated air from other spaces (secondary air) to the given space. A series fan terminal has a small secondary air fan which conveys primary and/or secondary air to the space that it serves. This fan delivers essentially a constant volume of air at all times. At the inlet of the unit, is a primary air inlet that is connected to the supply duct through a primary intake. A damper is provided in this primary air inlet, and is normally modulated on command of a space thermostat to vary the amount of treated or primary air to maintain space temperature. This series fan unit also has a secondary intake which draws secondary, or recirculated air from the ceiling area, or plenum, in which the unit is mounted. The secondary intake may also be connected to a return duct which channels air from the other spaces.

A parallel fan unit also has an inlet to draw secondary air from the ceiling plenum or return air ducts and a primary inlet with a damper that receives cooled or heated air (primary air) from the primary supply duct. Unlike the series fan unit, however, the primary air in a parallel terminal unit bypasses the secondary fan and discharges directly through an outlet into the space being served. The fan in the terminal unit is positioned in the secondary air inlet and draws secondary air and discharges it to the space. Thus, the fan can blow secondary air "in parallel" with primary air into the space.

A VAV terminal unit generally operates in the following manner. In a cooling operation the primary air is usually cooler than the desired temperature of the occupied spaces. Therefore, a signal from the thermostat that the temperature in the space is below the desired temperature will prompt a controller to close the primary air damper. The secondary fan in a series or parallel unit will compensate for the reduction of primary air by drawing in relatively more air through the secondary air inlet, thus providing a relatively constant volume of air to the space. The secondary air is already relatively warm because it is being drawn from occupied spaces and/or has picked up additional heat from lights, office equipment, body heat, etc. These units may also include an auxiliary heater to further heat the recycled air if the recycled air is not warm enough. In a series terminal, the secondary fan must run whenever air for heating, ventilating, or air conditioning is required in the space because air delivered to the space, whether it's primary cold air, or recycled warm air, passes through the terminal unit fan. The fan in a parallel terminal is run only when secondary flow is required.

If the space temperature is above the set point of the space thermostat, the damper in the primary air duct is controlled to deliver a volume of cool air to the space. In a parallel terminal unit, the secondary fan turns off when the primary damper opens beyond a set level. As the space temperature falls below the desired temperature, the primary air damper begins to close and delivers less cool air to the space. When the primary airflow is reduced, the amount of secondary air blown through the box is increased to deliver a net constant volume of total air to the space to keep the air circulation at an acceptable level. When the room or building is unoccupied, the controller may at times close the primary air damper and cycle the terminal unit fan (and auxiliary heat) on and off as necessary to maintain the desired "unoccupied" temperature in the space. In addition, a controller for one or more terminal boxes may send a signal to a controller on the central air handling unit to turn on and supply cold primary air if the space temperature rises above the "unoccupied" cooling set point.

Dual duct dual fan VAV systems are similar to parallel fan terminal units in that primary air, a mixture of outdoor air and return air or 100% outdoor air, is delivered to a VAV terminal near the space to provide a desired air flow to the space on demand from the space thermostat. Instead of individual fan terminals drawing air from the return plenum to provide increased air flow and or heating capability to the space, the return air from the spaces is returned to a common "hot duct" or "neutral duct" fan where the air is heated and/or filtered, if required during the winter months, or recirculated as either neutral or cooled air during the summer months. This air is delivered to the space either through a separate VAV box also under control of the space thermostat, or to a "dual-duct terminal unit" that has two inlets and two damper assemblies both under control of the space thermostat.

If the space temperature is above the set point of the space thermostat, the damper in the primary cold air duct is controlled to deliver a volume of cool air to the space. As the space temperature falls below the desired set point, the primary cool air damper begins to close and delivers less cool air to the space. When primary cool airflow is reduced, the secondary (hot duct) airflow is increased to provide heat if necessary and keep room airflow at an acceptable level.

In the unoccupied mode, the primary cool fan is shut off, the primary cool air dampers in the spaces are closed, and the primary heating/neutral fan is cycled to maintain reduced space temperature. In some instances where the return/neutral fan handles cool air in the summer months, the damper opens to provide additional cooling if the primary cold duct cannot supply sufficient cool air.

In the past, energy efficiency has often overridden concerns for interior air quality. Air quality problems, however, can cause headaches, fatigue, congestion, blurred vision, and, in extreme cases, certain diseases. While the above systems and other conventional HVAC systems have been acceptable systems for heating and cooling spaces, they have not fully addressed the air quality of the interior spaces. A substantial but unresolved need has existed and does exist for HVAC systems that condition spaces efficiently, while still providing quality air which does not detrimentally affect the conditioned environments.

The difficulty of maintaining a uniformly acceptable air quality in all of the spaces served by a conventional environmental control system can be illustrated with reference to typical winter and summer operating conditions.

During the winter months, the perimeter spaces of the building require more heating than the interior spaces. When the controller determines that a space needs to be heated, it closes the primary air damper in the terminal unit. The secondary air damper then opens to introduce secondary air to the space. If the secondary air is not warm enough, it is heated by an auxiliary heater in the terminal unit. Most systems automatically close the primary air damper when the heated secondary air is blown through the unit to avoid wasting energy on simultaneous heating and cooling. In contrast, the intermediate spaces will not be subject to the temperature changes experienced at the perimeter, and are usually sufficiently warmed by body and equipment heat so that if any temperature regulation is required, it is usually to cool the spaces. Thus, cooling only terminal units are often located in the interior zones and deliver primary air to the interior spaces when the controller determines that the interior spaces are too warm. Therefore, most of the fresh, primary air will be delivered to the interior spaces because perimeter zones will so often need to be heated by the introduction of secondary air. This disparity of primary (outside) air distribution causes the concentration of $CO_2$ in the perimeter zones to increase relative to the interior zones.

In the summer, the perimeter spaces are heated by thermal transmission through an outer wall or window, air infiltration from outside, and/or solar heating. In order to cool the perimeter spaces, the controller directs a greater amount of primary air to the perimeter spaces. The interior spaces, however, require relatively less cooling. Therefore, in the summer, the interior spaces receive relatively less primary air, and the air quality in the spaces suffers.

There have been some efforts to increase air quality and meet ventilation code requirements, but these efforts have lead to systems having limitations in efficiencies. For example, many systems deliver a constant volume of outdoor air, or at least more than a minimum amount of outdoor air, to the spaces at all times. The amount of outdoor air to be delivered is calculated based on the estimated maximum number of people in a space. Thus, in these systems, the amount of outdoor air delivered to the building is usually greater than the amount needed to meet appropriate standards. As a result, those system have considerable inefficiencies, particularly in the form of energy loss wasted to heat or cool the extra outdoor air.

Other systems monitor the amount of $CO_2$ returning to the central unit through the return ducts, and decrease $CO_2$ levels by introducing a greater amount of fresh, outdoor air to the central air treating unit. Thus, a certain amount of outdoor air is mixed with the primary air flow to dilute contaminants such as volatile organic compounds (VOC's), which are given off by building materials or certain office supplies. Because the $CO_2$ level in the air returning to the central unit is monitored, these systems only control the total amount of $CO_2$ in the building rather than the amount in the individual spaces. Therefore, in the summer excess outdoor air is delivered to the perimeter zones while the air quality of the interior suffers, and in the winter the perimeter air quality suffers while excess outdoor air is delivered to the interior zones even though the average $CO_2$ concentration is at an acceptable level.

Delivering excessive outdoor air to a space is costly from an energy standpoint. First of all, energy is required to heat or cool, humidify or dehumidify, and filter the outdoor air at the central unit, and a central fan must be activated to deliver the primary air to the supply duct. Moreover, excess primary air requires heating by terminal units when it is delivered to the spaces. Therefore, energy efficiency is sacrificed by systems that simply provide excess outdoor air to decrease the $CO_2$ level in the office spaces.

SUMMARY OF THE INVENTION

The advantages and purposes of the invention will be set forth in part in the description which follows, and in part will be obvious from the description, or may be learned by practice of the invention. These advantages and purposes will be realized and attained by means of the elements and combinations particularly pointed out in the appended claims.

To attain the advantages and in accordance with the purpose of the invention, as embodied and broadly described herein, the invention comprises a method of controlling the concentration of a contaminant in a space to be conditioned by determining a contaminant concentration in a space, comparing the contaminant concentration to a predetermined concentration value of the contaminant, and decreasing the contaminant concentration in the space, when the contaminant concentration exceeds the predetermined concentration value, by increasing the flow of unvitiated air having a lower contaminant concentration into the space.

In another aspect, the invention comprises a terminal unit for use in an air handling system having a primary air intake including a primary damper for controlling the amount of primary air supplied to a space, a secondary air intake for introducing secondary air to the space, and means for increasing the flow of secondary unvitiated air into the space in response to an increase in contaminant concentration in the space.

In yet another aspect, the invention comprises an air handling system for controlling the concentration of a contaminant in a space within a multi-zone area to be conditioned, the area having a plurality of spaces. The system includes a central treating unit for treating primary air, a primary duct system for conveying primary air to a plurality of spaces, at least one terminal unit serving at least one space, the terminal unit including a primary air intake connected to the primary duct system and a secondary air intake, a device for sensing the concentration of a contaminant in the space served by the terminal and means for controlling the concentration of the contaminant in the space by increasing the flow of unvitiated secondary air in the space, when the sensed concentration of contaminant in the space is too high.

BRIEF DESCRIPTION OF THE DRAWINGS

The accompanying drawings, which are incorporated in and constitute a part of this specification, illustrate one embodiment of the invention and together with the description serve to explain the principles of the invention. In the drawings.

FIG. 3b is side view of the components shown in FIG. 3a; and

DETAILED DESCRIPTION OF THE PREFERRED EMBODIMENT

Reference will now be made in detail to the invention, examples of which are illustrated in the accompanying drawings. Wherever possible, the same reference numbers will be used throughout the drawings to refer to the same or like parts.

Figure 1:
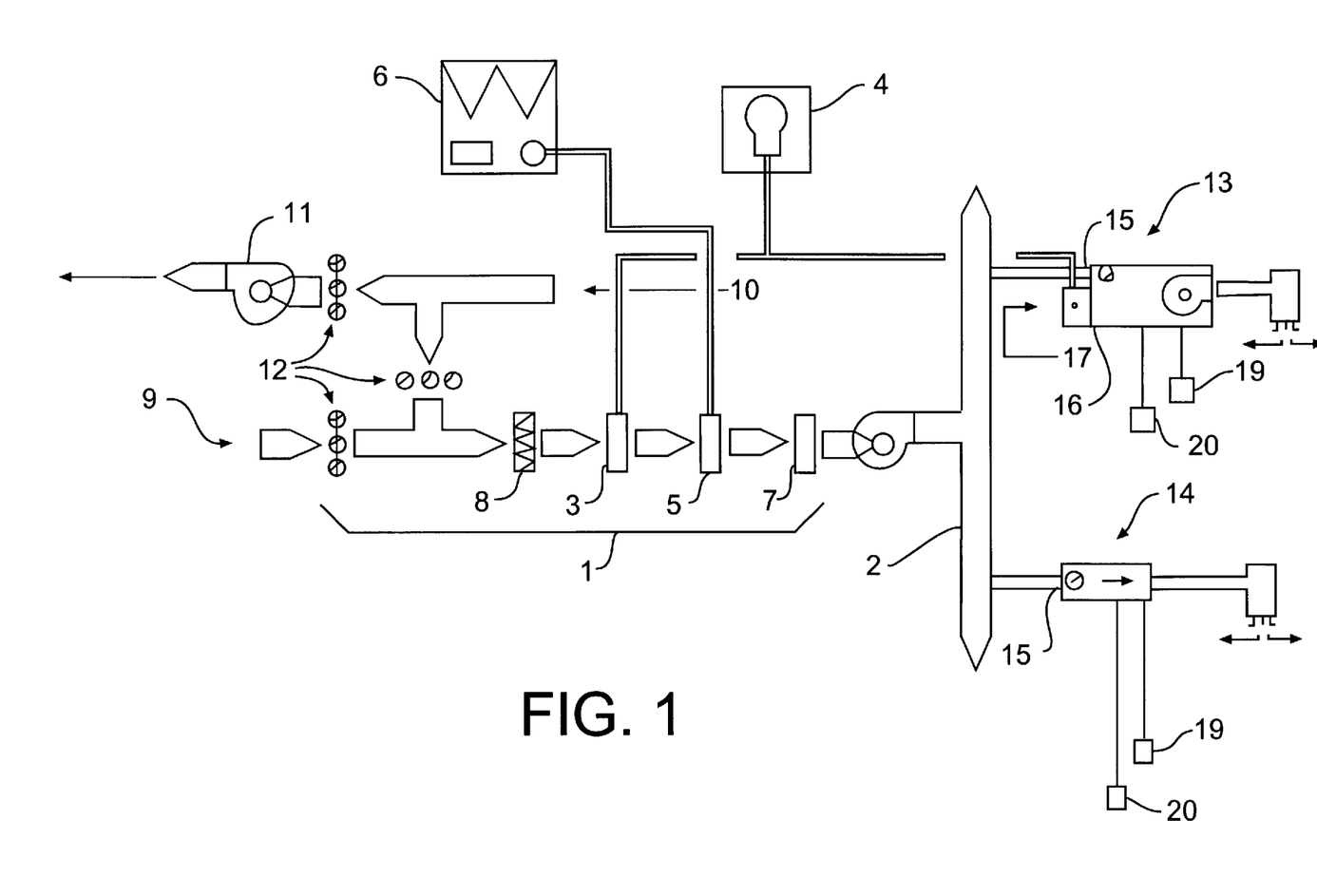
FIG. 1 is a schematic view of an air handling system according to the present invention.

An embodiment of the air handling system according to the invention is illustrated in FIG. 1. The central treating unit 1 treats primary air and directs it out through the building or floor through primary air duct 2. The central treating unit 1 may include a heater 3 (which may, for example, be connected to a boiler 4), a cooler 5 which may be connected to a water chiller 6, a humidifier/dehumidifier 7, and filter 8 to filter the primary air to meet predetermined comfort and air quality standards. As will become apparent, the present invention can be applied to systems in which the air is treated by a wide variety of treating units including conventional HVAC units now available. The primary air is typically a mixture of outdoor air 9 and return air 10 which has already been previously applied to and circulated through the building. A discharge fan 11 discharges excess return air out of the system according to the systems main control. A system of dampers 12 controls the relative amounts of return outdoor air in the primary air and how much return air is exhausted out of the system. As is known in the art, the components of the air handling system are controlled by conventional controls, most often a computing control.

In the present invention, a primary duct system 2 conveys the primary air to a plurality of terminal units that apply the primary treated air to at least two zones, each having at least one and preferably many separate spaces to be conditioned. For example, the area to conditioned can be an entire floor of an office building having an outer, perimeter zone with a plurality of separate office room spaces to be heated or cooled and one or more interior zones, similarly having a plurality of separate office spaces to be heated. Preferably, primary air is applied directly into each separate space and return air is pulled from the spaces through return air vents in the ceiling, which in turn are in fluid flow with the central unit by ducts and/or plenums in the ceiling. According to the invention, as the primary air is applied to some or all of the spaces within the area, some of the return air from one or more zones is applied to a space in another zone, where the air has a higher contaminant level than the return air. Thus, when the air within a space has an unacceptable level of contaminants in it, the terminal for that space is controlled to increase the flow of cleaner quality return air to the space and thereby decrease the level of contaminants.

Figure 2:
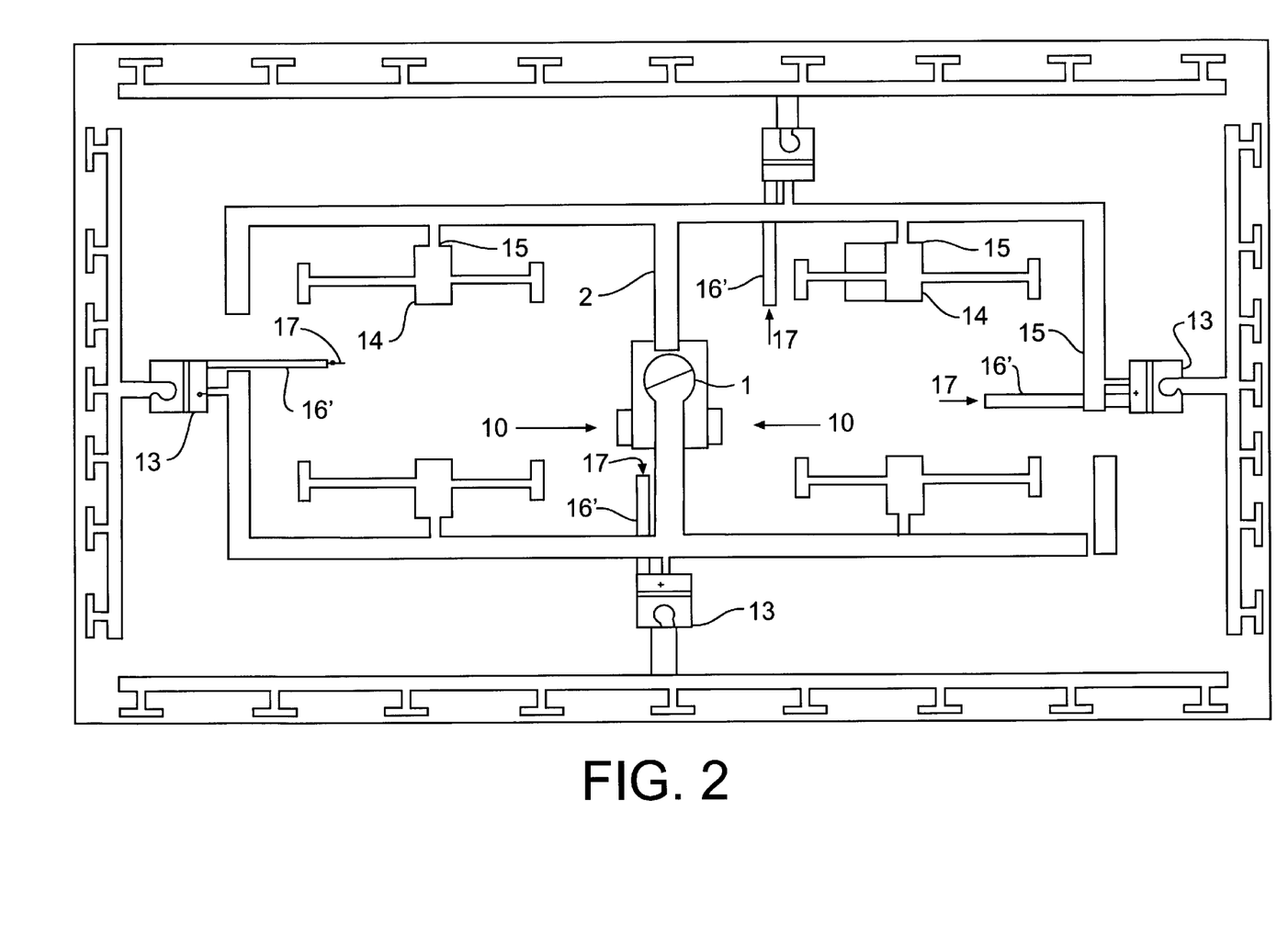
FIG. 2 is a floor plan showing an embodiment of an air handling system design of the present invention.

An example of the zones and terminals according to the present invention is illustrated in FIG. 2. For the purposes of explanation, it will be assumed that the plan area to be conditioned for only two primary zones, a perimeter zone along the outside of the building and an interior zone heating/cooling with terminal units 13 serving the perimeter spaces and terminal units 14 serving the interior spaces. A primary air intake 15 connects each terminal unit to the primary duct system. A variety of different terminal units can be utilized, depending upon the HVAC system being used and the characteristics of the space being conditioned. For example, the terminal units can be variable air volume terminal units, specifically, parallel or series variable air volume fan terminal units.

Figure 3A:
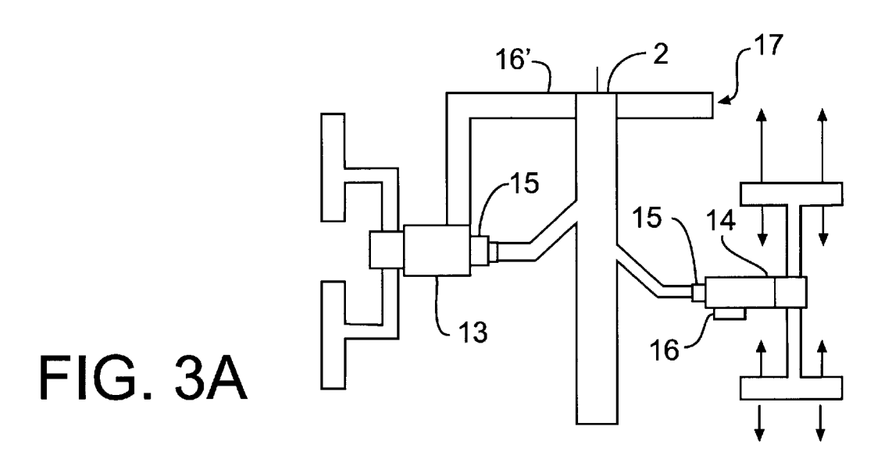
FIG. 3a is top view illustrating components of the present invention serving interior and perimeter zones of an area to be conditioned.
Figure 3B:
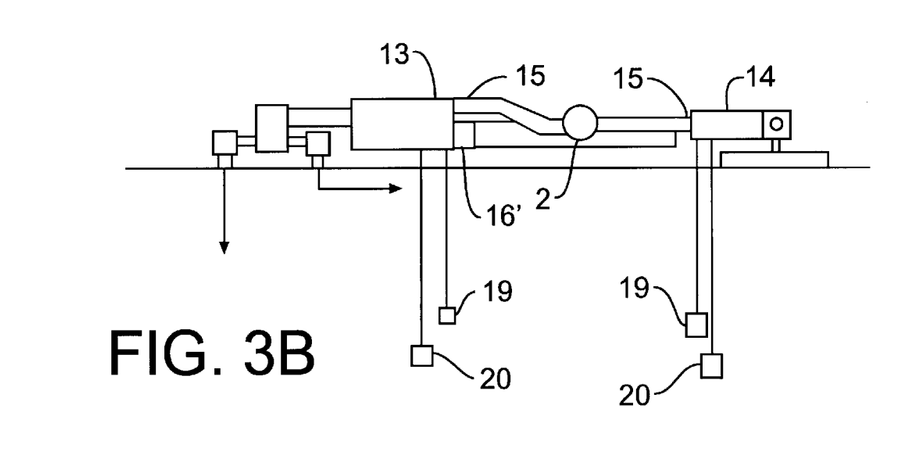

FIGS. 3A and 3B illustrate portions of an air handling system made according to the present invention. Primary air from a central treating unit is introduced to system by a primary duct 2. The zone to the left of the primary duct represents a perimeter zone of the area to be conditioned, and the zone to the right represents an interior zone. Ultimately, a plurality of spaces, such as offices, are conditioned by the introduction of air through vents that direct a supply of primary and/or secondary air to the spaces. In addition, return vents (typically in the ceiling) draw return air from the spaces and into a return plenum and/or ducting ultimately connected with the central air handling and treating unit, as shown in FIG. 1. In the present invention, one or more terminals of the present invention, which are described more fully below, have secondary inlets which can selectively draw secondary air, preferably from a location having secondary air with contaminant characteristics that are less than that of the air in the spaces to which the terminal box is supplying primary air, and then apply this secondary air, alone or in combination with primary air, to the space the terminal serves. The level of contamination is monitored in the space to be served by a sensor associated with the control for the terminal, and the flow of the secondary air, with better contaminant characteristics, is initiated or increased, when the contaminate level in the space served by the terminal exceeds a preselected maximum level. The flow of secondary air can be controlled by a variety of devices, variable speed fans and/or multi-position dampers being preferred examples.

As explained more fully below, the terminal units of the present invention can take a variety of forms and preferably are capable of applying only primary air, or a combination of primary and secondary air, or only secondary air, in response to sensed parameters and control processes. The terminal units preferably include control elements, such as dampers and fans in the terminal. Depending upon the characteristics of the areas to be conditioned, different terminal boxes can be used. In all cases, the terminal boxes of the present invention can selectively initiate or increase the flow of secondary air from one zone to a space in another zone. The preferred control system of the present invention will increase the flow of secondary air from one zone to another, causing more unvitiated outside air from one zone to flow to the space having too high a level of contaminants.

As will be explained more thoroughly below, in a preferred embodiment the terminal boxes of the present invention that serve the perimeter zone draw secondary air returned from the interior zones. This can be achieved by ducting. For example, in FIGS. 2 and 3 ducts 16' are connected to the secondary inlet of the terminal 13, which serves the perimeter zone. As a result, the secondary air ultimately applied to the perimeter zone by box 13 has characteristics identical to or more like the air in the interior spaces. The same effect can be achieved by locating the terminal box with a secondary inlet above the interior space and ducting the output air of the terminal box to a space in the perimeter zone.

The terminal boxes of the present invention that serve the interior zone do not necessarily need to include ducting to the perimeter zone, as opposed to a secondary inlet open to the plenum around a terminal box at the interior zone. This is because, the return air above the interior space is, in the example above in FIG. 2, a combination of return air from the perimeter zone and the interior zone, since the return air is drawn to the center of the area to be conditioned by the central air handling system. Thus, terminal boxes 14 shown in FIG. 2 could draw this mixed return air directly from the plenum surrounding it, and the secondary air, when drawn, would have air quality characteristics more like that in the perimeter zone, than that in the interior zone. Nevertheless, in some applications the invention will benefit from designs in which the terminal box for the interior zone has ducting, similar to ducting 16' previously discussed, which permits the interior boxes to draw return air immediately above the perimeter zone.

When, cooling only terminal units are used to serve some interior spaces, those terminals do not have inlets for inducing secondary air. When the present invention is applied to such system, the cooling only interior boxes may be used in conjunction with parallel fan units or dual duct ("heating") boxes. In such an embodiment, the fan terminals or dual duct boxes can be controlled to transfer air from another zone, such as a perimeter zone, to a space in an interior zone.

Figure 4:
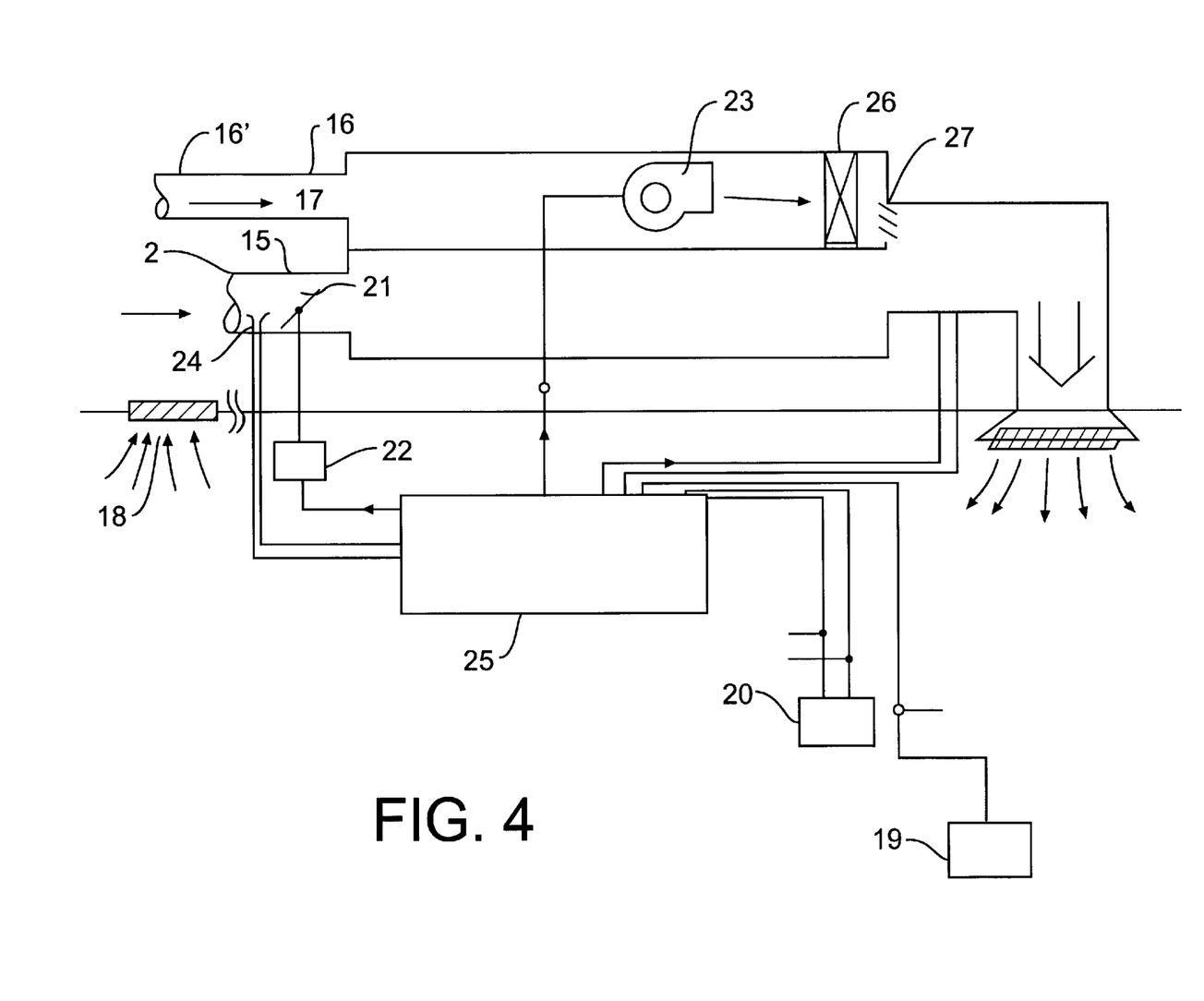
FIG. 4 is a schematic view showing an embodiment of a terminal unit according to an embodiment of the invention.

For purposes of illustration, an embodiment of a terminal unit for use in the air handling system according to the invention is shown in FIG. 4. This unit is a parallel box since the fan 23 draws only secondary air, which flows in parallel with the primary air. As can seen in the figure, the terminal includes a primary air intake 15 with a primary, multi-position damper 21. The primary damper 21 is controlled by actuator 22 for adjusting the amount of primary air blown through the unit to a space. The terminal also has a secondary air intake 16 that introduces a controlled volume of secondary air 17 to the space by the operation of a secondary fan 23, which is preferably a multi-speed fan connected to a fan speed regulator. For example, a terminal unit could be located in a ceiling plenum, and the secondary air drawn from the ceiling plenum. This embodiment also includes an auxiliary heater 26, which can selectively heat the return air, as required. An on-off or a multi-position back draft damper 27 may be included as part of the terminal and located downstream from the secondary fan 23 to prevent primary air from exiting the unit through the secondary intake when the secondary fan is not operating.

The invention includes at least one, and preferably a plurality of sensing devices 19 that determine the presence or concentration of a contaminant in one or more spaces. One example of such a device 19 is a carbon dioxide concentration sensor. However, different or several devices can be used to determine the concentration of a one or more contaminants in the space. For example, the device can detect contaminants other than carbon dioxide, such as VOC's, tobacco smoke, odors, automobile exhaust, noxious gases, smog, and nitrous oxide. The device can also detect some proxy for the presence or concentration of a contaminant, such as the number of persons in the room.

Other sensing devices also are included in the preferred system of the present invention to control devices within or associated with the terminal unit. These include such devices as a thermostat 20 and a primary airflow sensor 24 for determining the primary air flow through the primary air intake 15. The system can also include a contaminant sensor at other locations, such as the points where secondary air is introduced into a terminal unit, to determine whether the secondary air being introduced into the space has better contaminant characteristics than the air in the space served by a given terminal. All of these sensing devices provide input data to controller 25 which controls the primary damper 21, the secondary fan 23, the back draft damper 27, and the auxiliary heater 26 of the terminal. Some or all of these sensed parameters can also, if desired, be used as inputs to control the central treating unit and the air handling system. Typically, all of the control variables can be measured and governed by a single controller. It is possible, however, to use multiple controllers for the various functions.

The system and the terminal unit regulates the amount of a contaminant, for example, $CO_2$, in a space by the following process. The central unit 1 treats primary air which is conveyed out to a plurality of spaces, for example, offices, through a supply duct system 2 which directs the primary air into the space to be conditioned, normally through a primary intake 15 of the terminal unit. This primary air contains some new, outdoor air. A primary damper 21 can be incrementally opened or closed and thereby controls the amount of primary air that blows through the unit, usually in response to thermostat 20. If the temperature in the space is too high when the area is being cooled, the damper opens incrementally to allow in a greater amount of primary air. If the temperature is too low, the damper incrementally closes and the fan 23 in the secondary duct is turned on or sped up, either step-wise or gradually, to introduce a relatively greater amount of warm, secondary air to the space through a secondary air intake 16.

In the preferred embodiment, the secondary air is return air from another zone or space having better contaminant characteristics, or a mixture of return air from several zones or spaces, the mixture having better contaminant characteristics, than in the space to which the secondary air is directed. This secondary air contains an amount of unvitiated air, for example, unused outdoor air placed in the system by the primary treating unit and air handler. For the purposes of the invention, unvitiated air is secondary return air that contains a lower concentration of contaminants, such as carbon dioxide, than the space to be conditioned by the introduction of the unvitiated air. The most common source for unvitiated air is secondary air that is drawn into the ceiling plenum from spaces having different heat transfer or load characteristics. For example, the $CO_2$ levels in the unoccupied spaces are much lower than the levels in the occupied spaces. Another source for unvitiated air may be those spaces or zones that receive a relatively greater amount of primary air. For example, assuming similar occupancies, in the winter, the interior spaces or zones may be sources of unvitiated air, while in the summer the perimeter spaces or zones are sources of unvitiated air.

In most conventional HVAC systems, the secondary air is preferably drawn into the ceiling plenum through return vents 18 located in the spaces or zones. In the example shown in FIG. 2, this secondary air is pulled towards the central unit which mixes the secondary air as return air with the outside air. Therefore, the secondary air in the plenum is a mixture of the secondary air drawn from all the spaces and will have a lower $CO_2$ level than the air in a space occupied by many people, or a space which is receiving less primary air, relative to other spaces. In the system shown in FIG. 2, the return air in the plenum over the perimeter zone has contaminant characteristics most like that of the air in that zone, while the mixture of the return air in the plenum over the interior zones has contaminant characteristics closer to an average value. As previously described, by varying the location of terminal boxes of the present invention and using ducting to define the location where the secondary air for a terminal is drawn and/or introduced, the system can be optimized for a particular floor plan using a particular HVAC system in a particular climate. In addition, the terminal boxes and ducting can be designed to direct and exchange secondary air between a plurality of zones within a building to be conditioned.

In the present invention, while the temperature is being monitored, the concentration of carbon dioxide in at least one space, and preferably a plurality of spaces, is also being monitored. If the carbon dioxide level in a space exceeds a preset level, the controller adjusts the concentration of the $CO_2$ in the space by increasing the volume of unvitiated air being supplied to that space.

For example, as the $CO_2$ level rises in the space, the controller gradually or incrementally increases the flow of unvitiated air into the space. This can be achieved, for example, by gradually or incrementally increasing the speed of the fan 23 in a terminal serving that space. Because the unvitiated air is either pulled from a space from a different zone or is representative of a mixture of air from all of the spaces, it has a lower $CO_2$ concentration than the air in the space. The secondary air is also at or near the same temperature of the air in the space being conditioned, and therefore, energy is not wasted heating primary air. When the area is being cooled, the flow of unvitiated air into the space reduces the $CO_2$ level in the space to an acceptable level without cooling the room below the desired temperature. In certain rare situations, however, it may not be possible to lower the $CO_2$ level in the space using only secondary air. In such a situation, the controller can be designed to open the primary inlet damper of the terminal and thereby introduce additional primary air to lower the $CO_2$ level in the space. A heater on the secondary inlet can be activated to offset the increased cooling caused by the introduction of excess primary air.

Optionally, the controller can be designed to send a command to a controller on the primary air handling unit to increase the percent of outdoor air in the primary air. Fans or other devices in the terminal can also be varied to effect an increase flow of primary air. By controlling the amount of unvitiated air transferred based on space temperature and $CO_2$, the present invention minimizes energy, consumption, while providing improved air quality.

If the space being monitored is a perimeter space, the terminal unit may be designed to draw air from an interior zone. As previously discussed, the interior zones tend to have a higher percentage of unvitiated air in the winter. Moreover, the air over the interior regions in the path of the perimeter return air is a good mix of secondary air from many spaces and zones. One way of drawing air from the interior to the perimeter spaces is to use ducting 16' to extend the secondary intake of the terminal units serving the perimeter units into the plenum over the interior spaces.

If the space being monitored is an interior space, it may be advantageous to place the interior terminal units in the return path of the secondary air from the perimeter spaces, or to extend the secondary intakes of the interior units out to the perimeter spaces. This may better ensure that unvitiated air from the perimeter spaces is introduced into the interior spaces to decrease $CO_2$ levels. This arrangement may be particularly advantageous in the summer, when the perimeter spaces receive relatively more primary air. If return ducts are used to return air to the central treating units, the secondary intake of one or more terminal may be connected thereto.

A variety of different terminal boxes can be used to practice the present invention, provided that the terminal boxes selectively accept and discharge secondary air and include at least a device to selectively increase or otherwise control the flow of secondary air into the space or spaces served by the terminal box. The terminal preferably includes a fan, placed in a series or a parallel arrangement, to increase the flow of secondary air; when increased flow is required. The terminal of the present invention also preferably can selectively accept and discharge primary air. Such a terminal also preferably includes a device, such as an adjustable damper, to control the flow of primary air to the space or spaces being served.

Figure 5:
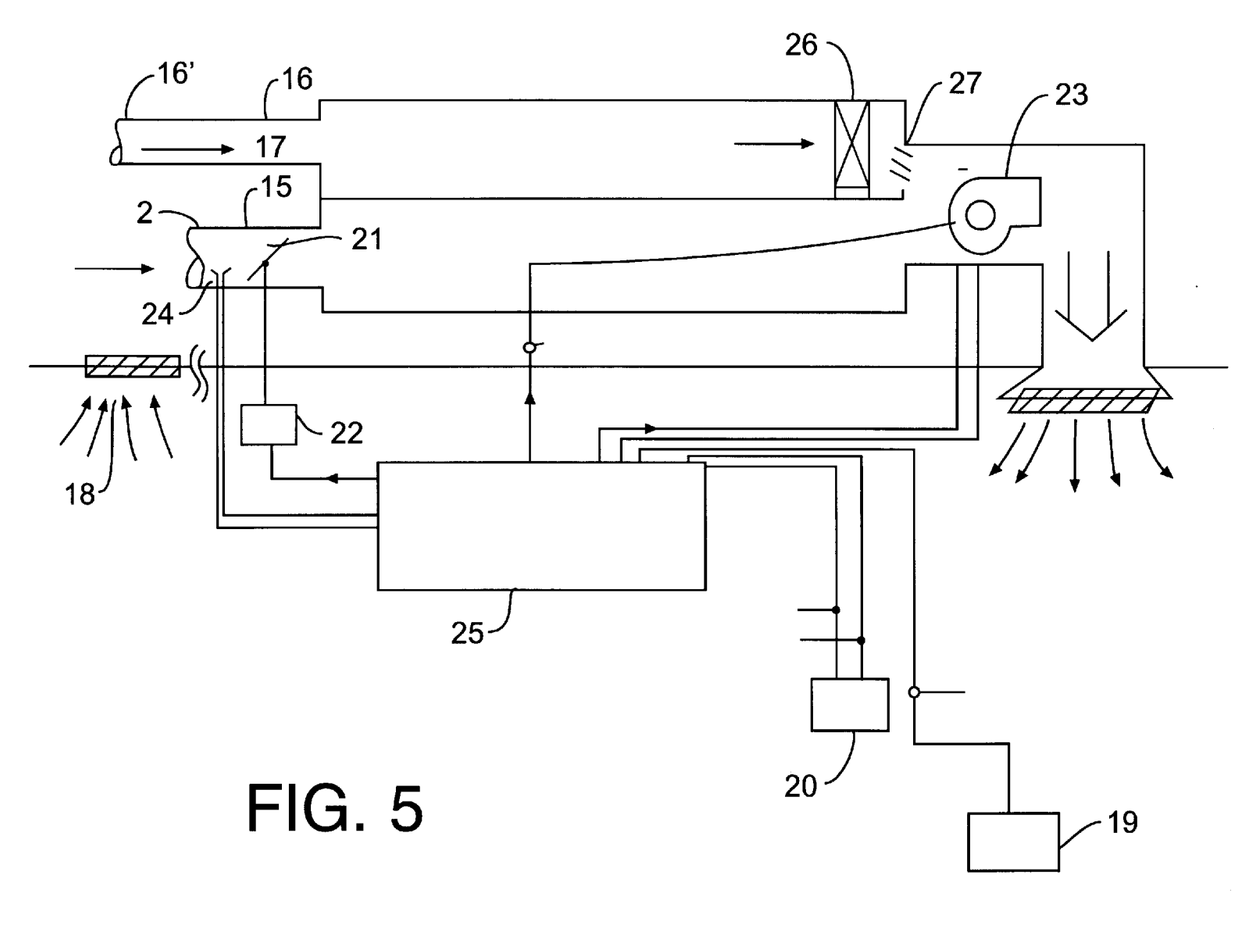
FIG. 5 is a schematic view showing another embodiment of a terminal unit according to an embodiment of the invention.

A terminal box similar to that shown in FIG. 4, but including a fan 23 in the series position, is illustrated in FIG. 5. The secondary duct in the terminals of FIG. 4 or 5 can also include a controlled damper 27, which can be positioned, upstream or downstream of the fan 23. The damper can be opened or closed to control the flow of secondary air.

Figure 6:
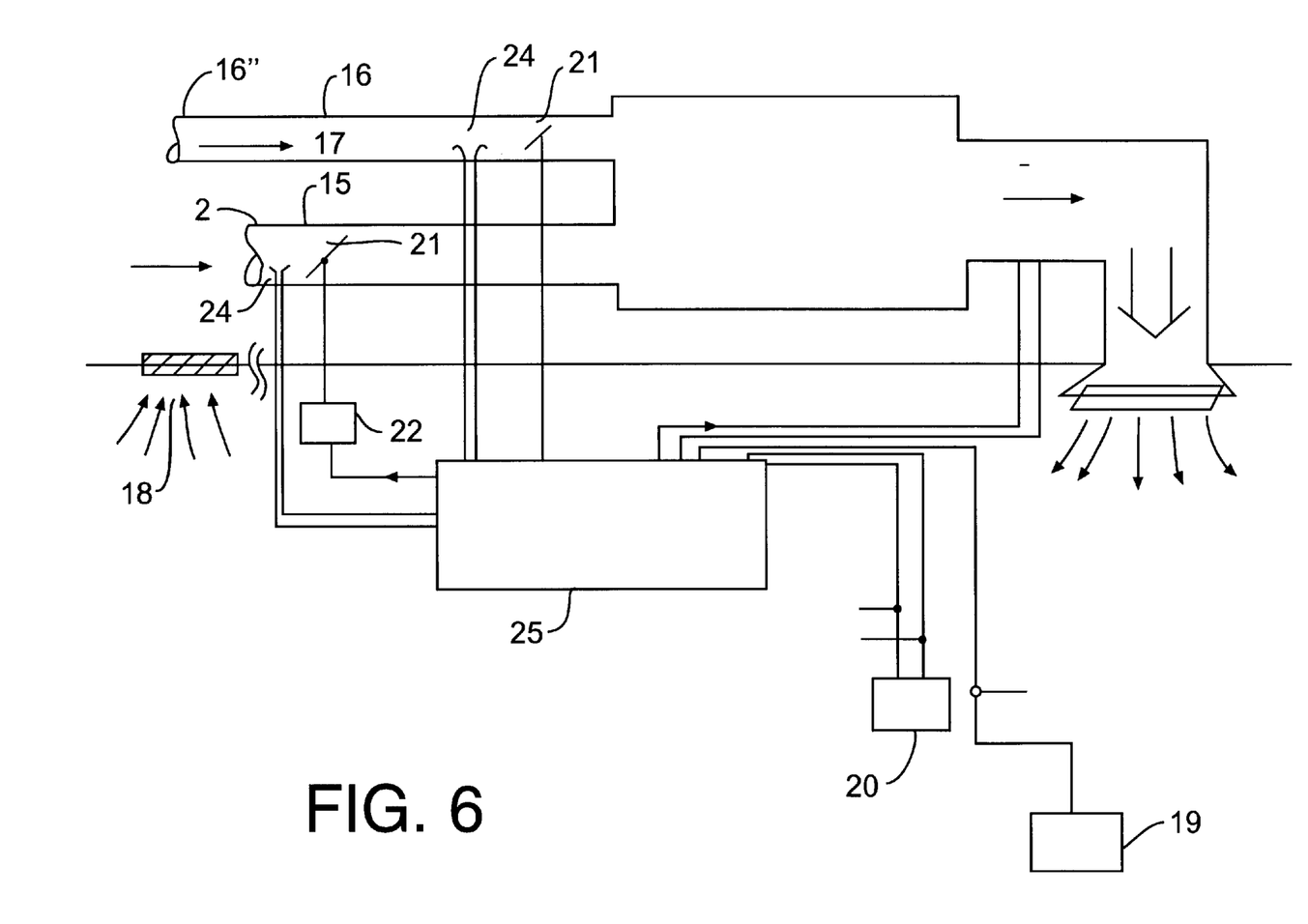
FIG. 6 is a schematic view showing another embodiment of a terminal unit according to an embodiment of the invention.

The present invention can be applied to dual duct-dual fan VAV system, where both the primary and secondary air flow are delivered to terminal units through separate ducts 2 and 16", respectively, and pressurized by central control fans. In such a system, a dual duct terminal box, shown in FIG. 6, can be used. That terminal includes controlled dampers 21 in both the primary and secondary ducts, but no fan in the terminal. In such a system when the $CO_2$ level in a space rises above the set point, the secondary (hot or neutral) damper in secondary duct the terminal unit is modulated toward the open position to increase the flow of secondary air to take advantage of unvitiated air that has been returned from zones that have excess outdoor air. The flow of primary and secondary air to the space is controlled according to the same general process described above.

It will be apparent to those skilled in the art that the methods, terminals, and devices of the present invention can be applied to most, if not all, conventional HVAC systems used to condition an area, having one or more zones. In addition, while the examples describe an application where the treated area has two zones (a perimeter and an interior), the invention can be applied by defining several separate zones in a building or area to be conditioned, with the described interchange and control of secondary return area in a manner that achieves improved or optimum quality of air, without expending unnecessary energy to heat or cool primary air more than is actually needed in the area as a whole. The contaminant level for a given space is sensed, and, when the level is too high, the flow of secondary air to the space is initiated or increased, by regulating devices such as fans and/or dampers. For example, a transfer air fan in the terminal serving the space is turned on, or the speed is increased, to draw previously conditioned secondary return air from a different space, as opposed to introducing more outside air to the space through an increased volume of primary air, or an increased relative proportion of outdoor air to the primary air.

It will be apparent to those skilled in the art that various modifications and variations can be made in the disclosed method and apparatus without departing from the scope or spirit of the invention. Other embodiments of the invention will be apparent to those skilled in the art from consideration of the specification and practice of the invention disclosed herein. It is intended that the specification and examples be considered as exemplary only, with the full scope of the invention being defined by the following claims.

What is claimed is:

1. A method of controlling the concentration of a contaminant in an indoor space to be conditioned, comprising:

determining a contaminant concentration in an indoor space;

comparing the contaminant concentration to a predetermined concentration value of the contaminant; and decreasing the contaminant concentration in the indoor space when the contaminant concentration exceeds the predetermined concentration value by increasing the flow of secondary return air drawn, at least in part, from an indoor space that has a lower contaminant concentration, into the indoor space.

2. The method of claim 1, wherein the contaminant is carbon dioxide.

3. The method of claim 1, wherein the unvitiated air is drawn from a ceiling plenum in which secondary air is collected from one or more spaces having better contaminant characteristics than that of the space to be conditioned.

4. The method of claim 1, wherein the flow of unvitiated air is increased by increasing the speed of a transfer fan that induces the flow of unvitiated air into the space to be conditioned.

5. The method of claim 4, wherein
the transfer fan is located in a terminal unit serving the space.

6. The method of claim 5, wherein
the terminal unit is a parallel variable air volume terminal unit.

7. The method of claim 5, wherein
the terminal unit is a series variable air volume terminal unit.

8. The method of claim 1, wherein the space is a perimeter space and the unvitiated air includes air drawn from an interior zone.

9. The method of claim 1, wherein the space is an interior space and the unvitiated air includes air drawn from a perimeter zone.

10. A method of controlling the concentration of contaminant level in a plurality of indoor spaces within an area to be conditioned, comprising:

treating primary air at a central treating unit;

selectively conveying the primary air from the central treating unit to the plurality of indoor spaces;

determining a contaminant concentration in at least one indoor space;

comparing the contaminant concentration to a predetermined concentration value to determine when a given indoor space has too much contaminant in its air; and decreasing the contaminant concentration in at least one indoor space where the contaminant level is too great by introducing into the indoor space secondary return air drawn, at least in part, from indoor space(s) that have lower levels of contaminant than that of the indoor space(s) to which the secondary return air is introduced.

11. The method of claim 10, wherein the contaminant is carbon dioxide.

12. The method of claim 10 further comprising the step of directing the primary air and secondary air into at least one terminal unit, said terminal unit including devices for selectively controlling the flow of primary and secondary air to the space served by the terminal unit.

13. The method of claim 10, wherein the secondary air is ceiling plenum air.

14. The method of claim 10, wherein
the terminal unit is a variable air volume terminal unit.

15. The method of claim 14, wherein
the variable air volume terminal unit is a parallel variable air volume terminal unit.

16. The method of claim 14, wherein
the variable air volume terminal unit is a series variable air volume terminal unit.

17. The method of claim 10, further comprising the steps of controlling the flow of primary air to the spaces, according to the sensed temperature in one or more spaces.

18. The method of claim 10, further comprising the step of increasing the flow of primary air to a space, if the contaminant level does not fall to an acceptable level after the maximum flow of secondary air is introduced into the space for a predetermined period of time.

19. A terminal unit for use in an air handling system comprising:

a primary air intake including a primary damper for controlling the amount of primary air supplied to an indoor space;

a secondary air intake for introducing secondary air to the indoor space; and means for increasing the flow of secondary air delivered into the space by drawing, at least in part air, from an indoor space that has a lower contaminant concentration and delivering said lower contaminant concentration air into the indoor space in response to an increase in contaminant concentration in the indoor space.

20. The terminal unit of claim 19, including a contaminant detector associated with the terminal for serving a contaminant in the space to be served by the terminal.

21. The terminal unit of claim 20, wherein said contaminant detector is a carbon dioxide concentration sensor.

22. The terminal unit of claim 19, wherein said means for increasing the volume includes a secondary air fan for conveying secondary air through said secondary air intake and into the space.

23. The terminal unit of claim 19, wherein said means for increasing the volume includes a damper for controlling the flow of secondary air through the terminal.

24. An air handling system for controlling the concentration of a contaminant in an indoor space within a multi-zone area to be conditioned, said area having a plurality of indoor spaces, the system comprising:

a central treating unit for treating primary air;

a primary duct system for conveying primary air to a plurality of indoor spaces;

at least one terminal unit serving at least one indoor space, said terminal unit including a primary air intake connected to said primary duct system and a secondary air intake;

a device for sensing the concentration of a contaminant in the indoor space served by said terminal unit; and means for controlling the concentration of the contaminant in the indoor space by increasing the flow of secondary air drawn, at least in part, from an indoor space that has a lower contaminant concentration in the space, when the sensed concentration of contaminant in the indoor space is too high.

25. The system of claim 24, wherein said means for determining the concentration of a contaminant is a carbon dioxide sensor.

26. The system of claim 24, wherein said secondary air intake is located in a ceiling plenum.

27. The system of claim 24, further comprising a means for drawing secondary return air from a location that is remote from the space served by the terminal unit.

28. The system of claim 27, wherein said drawing means is a duct having an inlet located in a return air channel located above a zone having better contaminant characteristics than that of the space being served by the terminal unit.

29. The system of claim 27, wherein said drawing means is an opening in the terminal box and further including ducting connected to terminal box and leading to the space to be served by the terminal box.

30. The system of claim 24, wherein the controlling means includes a variable speed fan in the terminal box for selectively drawing secondary air through the terminal box.

* * * * *